US011863430B2

(12) United States Patent
Padi et al.

(10) Patent No.: US 11,863,430 B2
(45) Date of Patent: Jan. 2, 2024

(54) DYNAMIC SHARED RISK LINK GROUP (SRLG) COMPRESSION

(71) Applicant: AT&T Intellectual Property I, L.P., Atlanta, GA (US)

(72) Inventors: Narayan Padi, Cedar Knolls, NJ (US); Gagan Choudhury, Jackson, NJ (US); Kenichi Futamura, Middletown, NJ (US); Shweta Vachhani, Edison, NJ (US); Alvin C. Goddard, Kendall Park, NJ (US); Timothy E. Gallivan, Marietta, GA (US); Harpreet Ahluwalia, Holmdel, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 60 days.

(21) Appl. No.: 17/675,790

(22) Filed: Feb. 18, 2022

(65) Prior Publication Data

US 2023/0269176 A1    Aug. 24, 2023

(51) Int. Cl.
*H04M 3/00* (2006.01)
*H04L 45/24* (2022.01)
*H04L 45/28* (2022.01)
*H04L 41/0659* (2022.01)

(52) U.S. Cl.
CPC ........ *H04L 45/245* (2013.01); *H04L 41/0659* (2013.01); *H04L 45/28* (2013.01)

(58) Field of Classification Search
CPC .... H04L 45/245; H04L 41/0659; H04L 45/28
USPC ............. 379/221.04, 221.03, 221.02, 221.01
See application file for complete search history.

(56) References Cited

U.S. PATENT DOCUMENTS

| | | | | |
|---|---|---|---|---|
| 6,947,376 B1* | 9/2005 | Deng | ...................... | H04L 45/22 370/219 |
| 10,432,342 B1* | 10/2019 | Bathula | .................... | H04L 41/40 |
| 2003/0147352 A1* | 8/2003 | Ishibashi | ............. | H04J 14/0228 370/248 |
| 2005/0188100 A1* | 8/2005 | Le Roux | ................. | H04L 47/70 709/238 |
| 2007/0230458 A1* | 10/2007 | Baba | ....................... | H04L 45/28 370/389 |
| 2012/0307644 A1* | 12/2012 | Gandhi | ............... | H04L 41/0893 370/241 |

(Continued)

OTHER PUBLICATIONS

Li, Guangzhi , et al., "On Shared Risk Link Group Optimization (Invited)", Journal of Optical Communications and Networking, vol. 4, Issue 11, 2012, Abstract, 4 pgs.

*Primary Examiner* — William J Deane, Jr.
(74) *Attorney, Agent, or Firm* — Guntin & Gust, PLC; Matthew Tropper

(57) ABSTRACT

Aspects of the subject disclosure may include, for example, generating a set of SRLGs associated with a set of link bundles, wherein the set of SRLGs comprises for each SRLG in the set of SRLGs an indication for each failed link bundle in a particular SRLG a respective bandwidth failure fraction, and wherein for at least one of the failed link bundles the failure is less than a complete failure; generating a set of dominance relationships among the SRLGs in the set of SRLGs, and generating, based at least in part upon the set of SRLGs and the set of dominance relationships a packed set of SRLGs, wherein the packed set of SRLGs comprises a subset of the set of SRLGs. Other embodiments are disclosed.

20 Claims, 10 Drawing Sheets

(56) References Cited

U.S. PATENT DOCUMENTS

| | | | |
|---|---|---|---|
| 2013/0232259 A1* | 9/2013 | Csaszar | H04L 45/028 709/224 |
| 2014/0126899 A1* | 5/2014 | Prakash | H04L 45/28 398/5 |
| 2017/0171066 A1* | 6/2017 | Hao | H04L 45/127 |
| 2018/0262421 A1* | 9/2018 | Skalecki | H04L 45/12 |
| 2020/0036623 A1* | 1/2020 | Kumar | H04L 45/22 |

* cited by examiner

2202

Creating, by a processing system including a processor, a first list comprising a plurality of Shared Risk Link Groups (SRLGs), wherein the first list identifies for each Shared Risk Link Group (SRLG) in the list one or more associated link bundles of a plurality of link bundles, wherein the first list indicates for each link bundle a respective bandwidth loss, and wherein at least one of the bandwidth losses is such that the respective link bundle maintains at least some available bandwidth

2204

Creating, by the processing system, a plurality of dominance relationships, wherein each dominance relationship comprises for two SRLGs an indication that one of the two SRLGs dominates another of the two SRLGs, and wherein the one of the two SRLGs dominating the another of the two SRLGs comprises: (a) the another of the two SRLGs having each associated failed link bundle also being failed by the one of the two SRLGs; and (b) each associated failed link bundle of the another of the two SRLGs having a respective bandwidth loss that is less than or equal to a respective bandwidth loss of the corresponding failed link bundle of the one of the two SRLGs

2206

Creating, by the processing system, based at least in part upon the first list and the dominance relationships, a second list of SRLGs, wherein the second list of SRLGs comprises a subset of the first list of SRLGs

2208

Facilitating, by the processing system, use of the second list of SRLGs to modify flow of traffic on a communication network

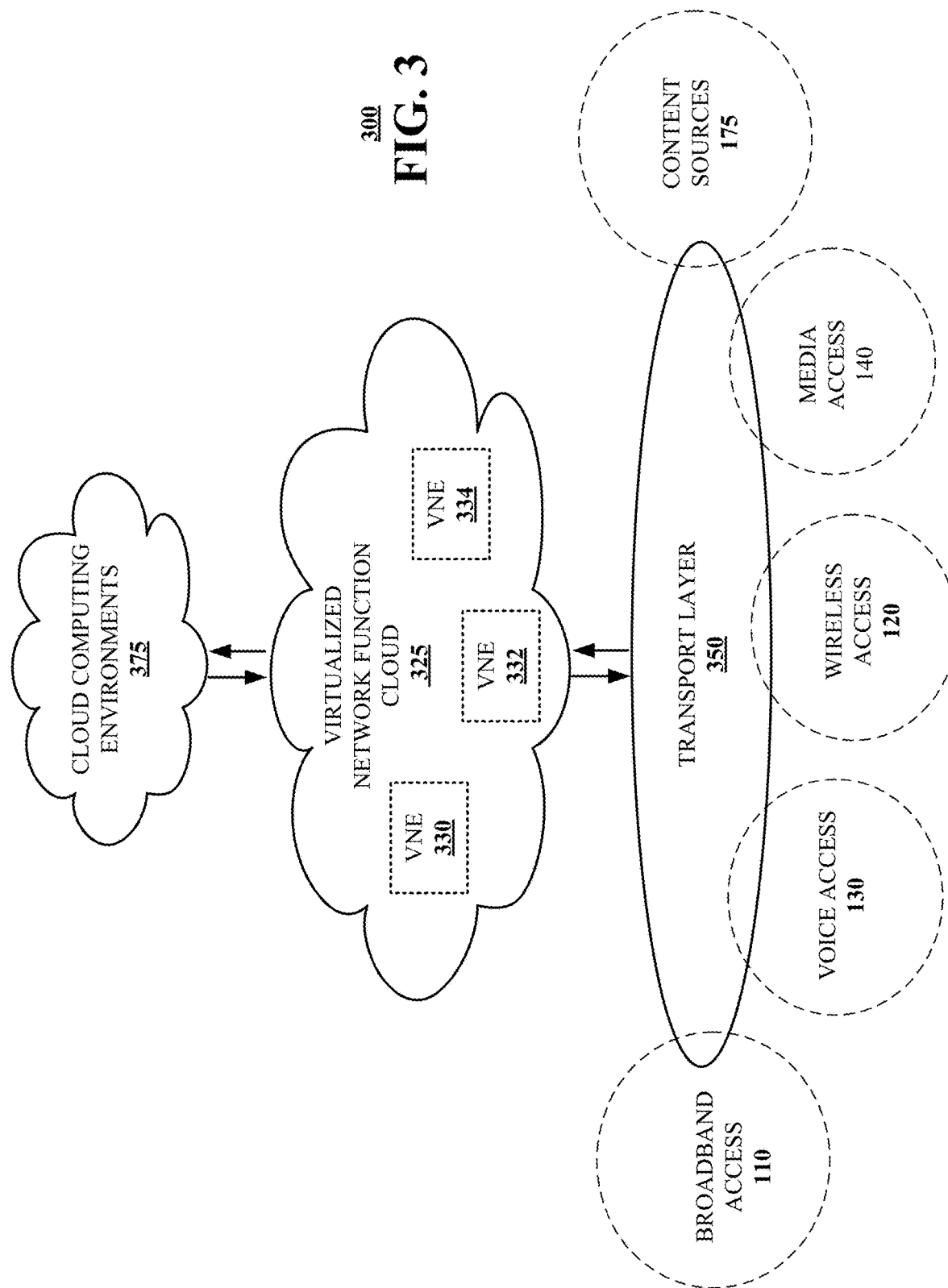

DYNAMIC SHARED RISK LINK GROUP (SRLG) COMPRESSION

FIELD OF THE DISCLOSURE

The subject disclosure relates to dynamic Shared Risk Link Group (SRLG) compression.

BACKGROUND

In certain conventional networks there is a constant need to add new capacity or rearrange capacities. This is typically done by adding or rearranging fiber optic circuits (wavelengths). Depending on various rules or constraints, layer 1 optical fiber paths may vary for different wavelengths of the same link bundle. Sections of the optical fiber paths that share common failure points are called SRLG's (Shared Risk Link Groups), and a wavelength may traverse many of these. To accurately identify possible failure states, a link bundle (such as a bundle of layer 1 optical link wavelengths) needs a complete set of significant SRLG's, since an SRLG failure could impact many link bundles. For example, this information is important for FRR (Fast Re-Route) computations as well as various failure analyses in network applications. These SRLG to link bundle associations are often very large in size and typically change frequently. As such, conventional algorithms analyzing possible failure states can be slow or out-of-date, resulting in static or suboptimal paths that cause congestion under failure or unnecessarily circuitous paths.

Further, SRLG changes that are applied in networks or in failure analysis have typically been calculated manually.

BRIEF DESCRIPTION OF THE DRAWINGS

Reference will now be made to the accompanying drawings, which are not necessarily drawn to scale, and wherein:

FIG. 2E depicts an illustrative embodiment of a method in accordance with various aspects described herein.

FIG. 3 is a block diagram illustrating an example, non-limiting embodiment of a virtualized communication network in accordance with various aspects described herein.

DETAILED DESCRIPTION

Figure 1:
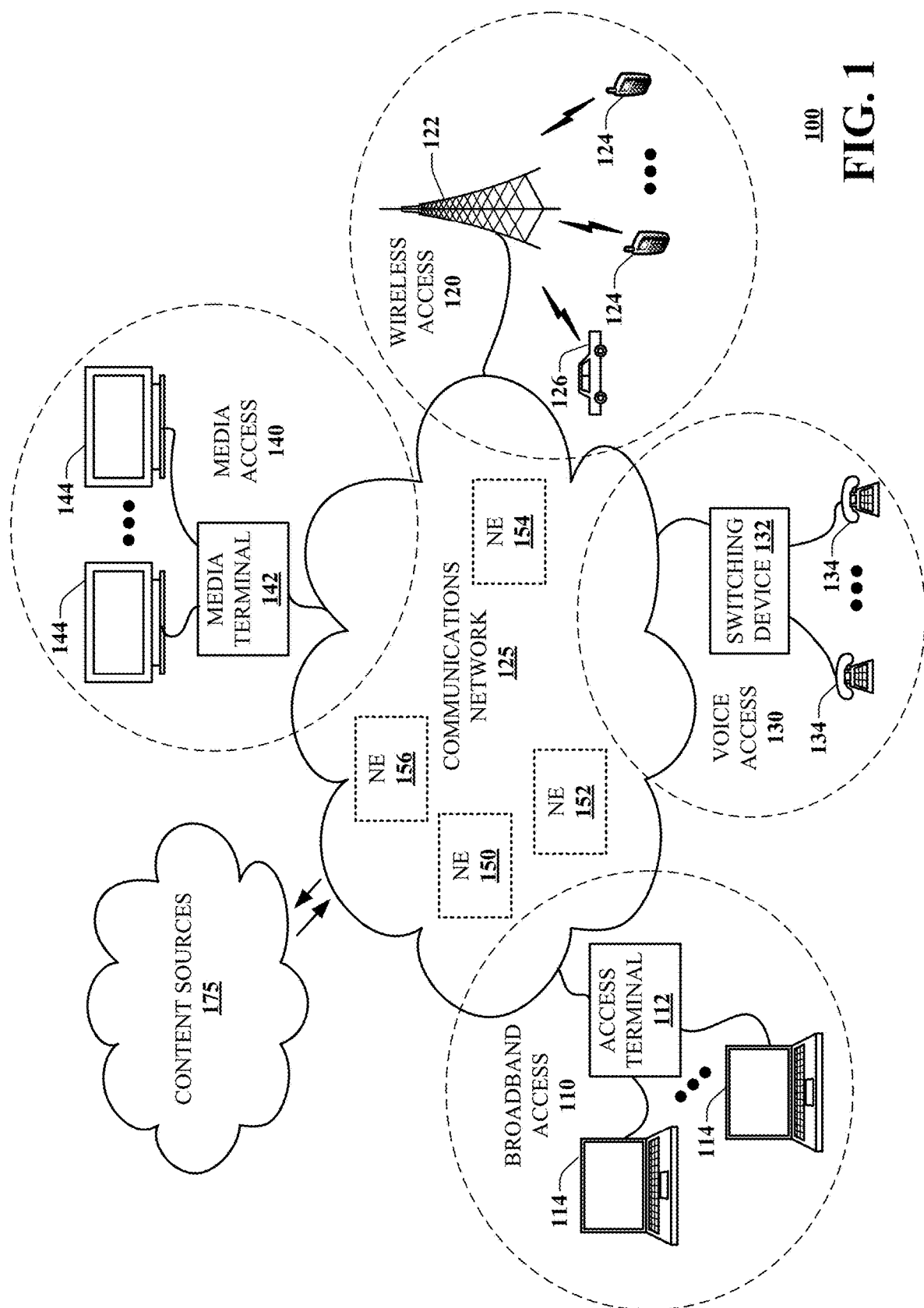
FIG. 1 is a block diagram illustrating an example, non-limiting embodiment of a communication network in accordance with various aspects described herein.

The subject disclosure describes, among other things, illustrative embodiments for dynamic Shared Risk Link Group (SRLG) compression. Other embodiments are described in the subject disclosure.

One or more aspects of the subject disclosure provide a compressed SRLG list and minimize changes to this list from one time to another (e.g., from one day to the next). By reducing the number of SRLGs without sacrificing the set of common failure states they represent, various embodiments can significantly decrease the time required for many failure analyses and computations. In addition, significant reduction in the total number of unique SRLGs that need to be maintained can also reduce the storage requirements at routers and/or other computational devices.

One or more aspects of the subject disclosure provide for calculation of a compressed SRLG list that maintains the integrity of the worst failure scenarios and compress the size of the original SRLG list. This compressed SRLG list can then be pushed to the network routers (e.g., in real-time) for use in FRR and/or other analyses. In other embodiments, one or more centralized algorithms can also (or instead) use the compressed SRLG list to calculate failure scenarios more efficiently. In other embodiments, as network change(s) necessitate change(s) in the compressed SRLG list, an algorithm can be used that maximally reuses the previous compressed SRLG list.

One or more aspects of the subject disclosure provide a device comprising: a processing system including a processor; and a memory that stores executable instructions that, when executed by the processing system, facilitate performance of operations, the operations comprising: generating a set of Shared Risk Link Groups (SRLGs) associated with a set of link bundles, wherein the set of SRLGs comprises for each Shared Risk Link Group (SRLG) in the set of SRLGs an indication for each failed link bundle in a particular SRLG a respective bandwidth failure fraction, greater than 0 and less than or equal to 1, and wherein for at least one of the failed link bundles the failure is less than a complete failure; generating a set of dominance relationships among the SRLGs in the set of SRLGs, wherein each dominance relationship comprises for two SRLGs an indication that one of the two SRLGs dominates another of the two SRLGs, and wherein the one of the two SRLGs dominating the another of the two SRLGs comprises: (a) the another of the two SRLGs having each associated failed link bundle also being failed by the one of the two SRLGs; and (b) each associated failed link bundle of the another of the SRLGs having a respective bandwidth failure fraction that is less than or equal to a respective bandwidth failure fraction of the corresponding failed link bundle of the one of the two SRLGs; and generating, based at least in part upon the set of SRLGs and the set of dominance relationships, a packed set of SRLGs, wherein the packed set of SRLGs comprises a subset of the set of SRLGs.

One or more aspects of the subject disclosure provide a non-transitory machine-readable medium comprising executable instructions that, when executed by a processing system including a processor, facilitate performance of operations, the operations comprising: obtaining first information associated with a plurality of Shared Risk Link Groups (SRLGs); obtaining second information associated with a plurality of link bundles, each link bundle of the plurality of link bundles being associated with one or more SRLGs of the plurality of SRLGs; creating a list comprising each SRLG of the plurality of SRLGs, wherein the list identifies a first number of SRLGs, and wherein the list indicates for each SRLG in the list a respective bandwidth loss of each associated link bundle, wherein at least one of the bandwidth losses is less than a complete loss of bandwidth; creating a plurality of dominance relationships, wherein each dominance relationship comprises for two SRLGs an indication that one of the two SRLGs dominates another of the two SRLGs, and wherein the one of the two SRLGs dominating the another of the two SRLGs comprises: (a) the another of the two SRLGs having each associated failed link bundle also being failed by the one of the two SRLGs; and (b) each associated failed link bundle of the another of the SRLGs having a respective bandwidth loss that is less than or equal to a respective bandwidth loss of the corresponding failed link bundle of the one of the two SRLGs; selecting a subset of the set of SRLGs, wherein the subset is selected based at least in part upon the list of SRLGs and the plurality of dominance relationships; and creating, based at least in part upon the subset, a compressed set of SRLGs that comprises a second number of SRLGs, wherein the second number is less than the first number.

One or more aspects of the subject disclosure provide a method comprising: creating, by a processing system including a processor, a first list comprising a plurality of Shared Risk Link Groups (SRLGs), wherein the first list identifies for each Shared Risk Link Group (SRLG) in the list one or more associated link bundles of a plurality of link bundles, wherein the first list indicates for each link bundle a respective bandwidth loss, and wherein at least one of the bandwidth losses is such that the respective link bundle maintains at least some available bandwidth; creating, by the processing system, a plurality of dominance relationships, wherein each dominance relationship comprises for two SRLGs an indication that one of the two SRLGs dominates another of the two SRLGs, and wherein the one of the two SRLGs dominating the another of the two SRLGs comprises: (a) the another of the two SRLGs having each associated failed link bundle also being failed by the one of the two SRLGs; and (b) each associated failed link bundle of the another of the two SRLGs having a respective bandwidth loss that is less than or equal to a respective bandwidth loss of the corresponding failed link bundle of the one of the two SRLGs; creating, by the processing system, based at least in part upon the first list and the dominance relationships, a second list of SRLGs, wherein the second list of SRLGs comprises a subset of the first list of SRLGs; and facilitating, by the processing system, use of the second list of SRLGs to modify flow of traffic on a communication network.

Referring now to FIG. 1, a block diagram is shown illustrating an example, non-limiting embodiment of a system 100 in accordance with various aspects described herein. For example, system 100 can facilitate in whole or in part dynamic compression applied to a list of Shared Risk Link Groups (as well as transmission of such compressed list of Shared Risk Link Groups to one or more network routers (e.g., in real-time) for use in FRR and/or other analyses). In particular, a communications network 125 is presented for providing broadband access 110 to a plurality of data terminals 114 via access terminal 112, wireless access 120 to a plurality of mobile devices 124 and vehicle 126 via base station or access point 122, voice access 130 to a plurality of telephony devices 134, via switching device 132 and/or media access 140 to a plurality of audio/video display devices 144 via media terminal 142. In addition, communication network 125 is coupled to one or more content sources 175 of audio, video, graphics, text and/or other media. While broadband access 110, wireless access 120, voice access 130 and media access 140 are shown separately, one or more of these forms of access can be combined to provide multiple access services to a single client device (e.g., mobile devices 124 can receive media content via media terminal 142, data terminal 114 can be provided voice access via switching device 132, and so on).

The communications network 125 includes a plurality of network elements (NE) 150, 152, 154, 156, etc. for facilitating the broadband access 110, wireless access 120, voice access 130, media access 140 and/or the distribution of content from content sources 175. The communications network 125 can include a circuit switched or packet switched network, a voice over Internet protocol (VoIP) network, Internet protocol (IP) network, a cable network, a passive or active optical network, a 4G, 5G, or higher generation wireless access network, WIMAX network, UltraWideband network, personal area network or other wireless access network, a broadcast satellite network and/or other communications network.

In various embodiments, the access terminal 112 can include a digital subscriber line access multiplexer (DSLAM), cable modem termination system (CMTS), optical line terminal (OLT) and/or other access terminal. The data terminals 114 can include personal computers, laptop computers, netbook computers, tablets or other computing devices along with digital subscriber line (DSL) modems, data over coax service interface specification (DOCSIS) modems or other cable modems, a wireless modem such as a 4G, 5G, or higher generation modem, an optical modem and/or other access devices.

In various embodiments, the base station or access point 122 can include a 4G, 5G, or higher generation base station, an access point that operates via an 802.11 standard such as 802.11n, 802.11ac or other wireless access terminal. The mobile devices 124 can include mobile phones, e-readers, tablets, phablets, wireless modems, and/or other mobile computing devices.

In various embodiments, the switching device 132 can include a private branch exchange or central office switch, a media services gateway, VoIP gateway or other gateway device and/or other switching device. The telephony devices 134 can include traditional telephones (with or without a terminal adapter), VoIP telephones and/or other telephony devices.

In various embodiments, the media terminal 142 can include a cable head-end or other TV head-end, a satellite receiver, gateway or other media terminal 142. The display devices 144 can include televisions with or without a set top box, personal computers and/or other display devices.

In various embodiments, the content sources 175 include broadcast television and radio sources, video on demand platforms and streaming video and audio services platforms, one or more content data networks, data servers, web servers and other content servers, and/or other sources of media.

In various embodiments, the communications network 125 can include wired, optical and/or wireless links and the network elements 150, 152, 154, 156, etc. can include service switching points, signal transfer points, service control points, network gateways, media distribution hubs, servers, firewalls, routers, edge devices, switches and other network nodes for routing and controlling communications traffic over wired, optical and wireless links as part of the Internet and other public networks as well as one or more private networks, for managing subscriber access, for billing and network management and for supporting other network functions.

Figure 2A:
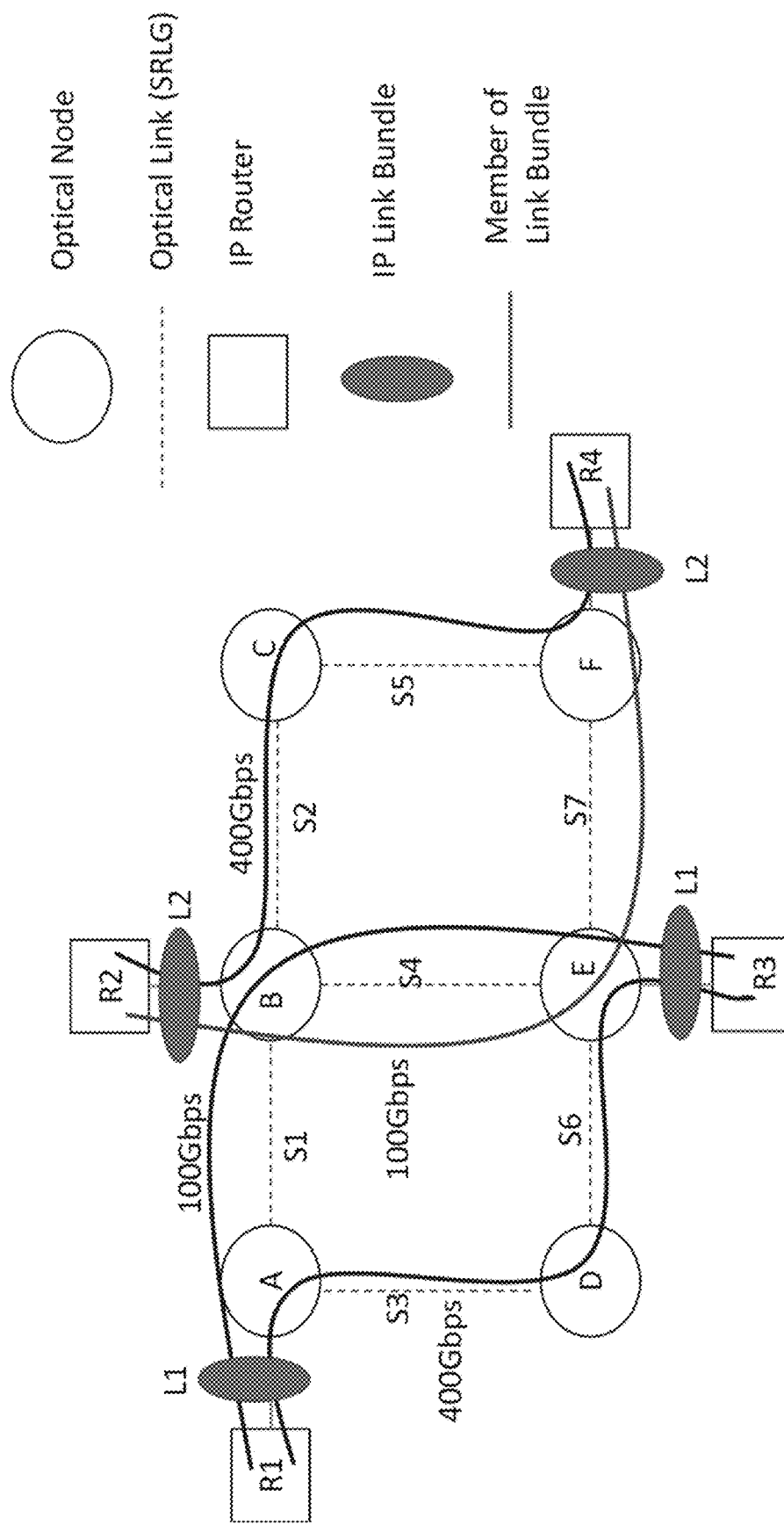
FIG. 2A is a block diagram illustrating an example, non-limiting embodiment of a network (which can function fully or partially within the communication network of FIG. 1) in accordance with various aspects described herein.

Referring now to FIG. 2A, this is a block diagram illustrating an example, non-limiting embodiment of a network (which can function fully or partially within the communication network of FIG. 1) in accordance with various aspects described herein. More particularly, in this example:

There are 6 Optical nodes: A, B, C, D, E, F

The Optical Nodes are connected by 7 Optical Links: S1, S2, S3, S4, S5, S6, S7 these are the 7 SRLGs

There are 4 IP Routers: R1, R2, R3, R4 (collocated with optical nodes A, B, E and F respectively)

There are 2 Link Bundles (L1 and L2) connecting the IP Routers

L1 connects R1 and R3, has total capacity of 500 Gbps, and has two members

Member 1 is 400 Gbps, uses the A-D-E path and so has SRLGs S3 and S6

Member 2 is 100 Gbps, uses the A-B-E path and so has SRLGs S1 and S4

L2 connects R2 and R4, has total capacity of 500 Gbps and has two members

Member 1 is 400 Gbps, uses the B-C-F path and so has SRLGs S2 and S5

Member 2 is 100 Gbps, uses the B-E-F path and so has SRLGs S4 and S7

Still referring to FIG. 2A, a discussion of impact of SRLG failures and the dominant SRLGs will now be made. More particularly, with regard to impact of SRLG failures of this example: S1 takes down 100 Gbps (20%) of L1; S2 takes down 400 Gbps (80%) of L2; S3 takes down 400 Gbps (80%) of L1; S4 takes down 100 Gbps (20%) of L1 and 100 Gbps (20%) of L2; S5 takes down 400 Gbps (80%) of L2; S6 takes down 400 Gbps (80%) of L1; S7 takes down 100 Gbps (20%) of L2. Further, with regard to an example packed (or compressed list of) SRLGs, the packed SRLGs are S2, S3 and S4 (explained as follows): S1 and S7 are not included since they are dominated by S4 (both of their failures are a subset of the failure of S4); S2 and S5 are equivalent but only S2 is included since it is earlier in the order; S3 and S6 are equivalent but only S3 is included since it is earlier in the order. Further still, a variation can be as follows: Suppose at a later point of time we add a third Link bundle L3 from R1 to R2 with a single 100 Gbps member going from A to B using the SRLG S1. In this scenario, S1 will also need to be in the packed SRLG list since it will now fail 20% of L1 and 100% of L3 and so would no longer be a subset of the failure of S4.

Figure 2B:
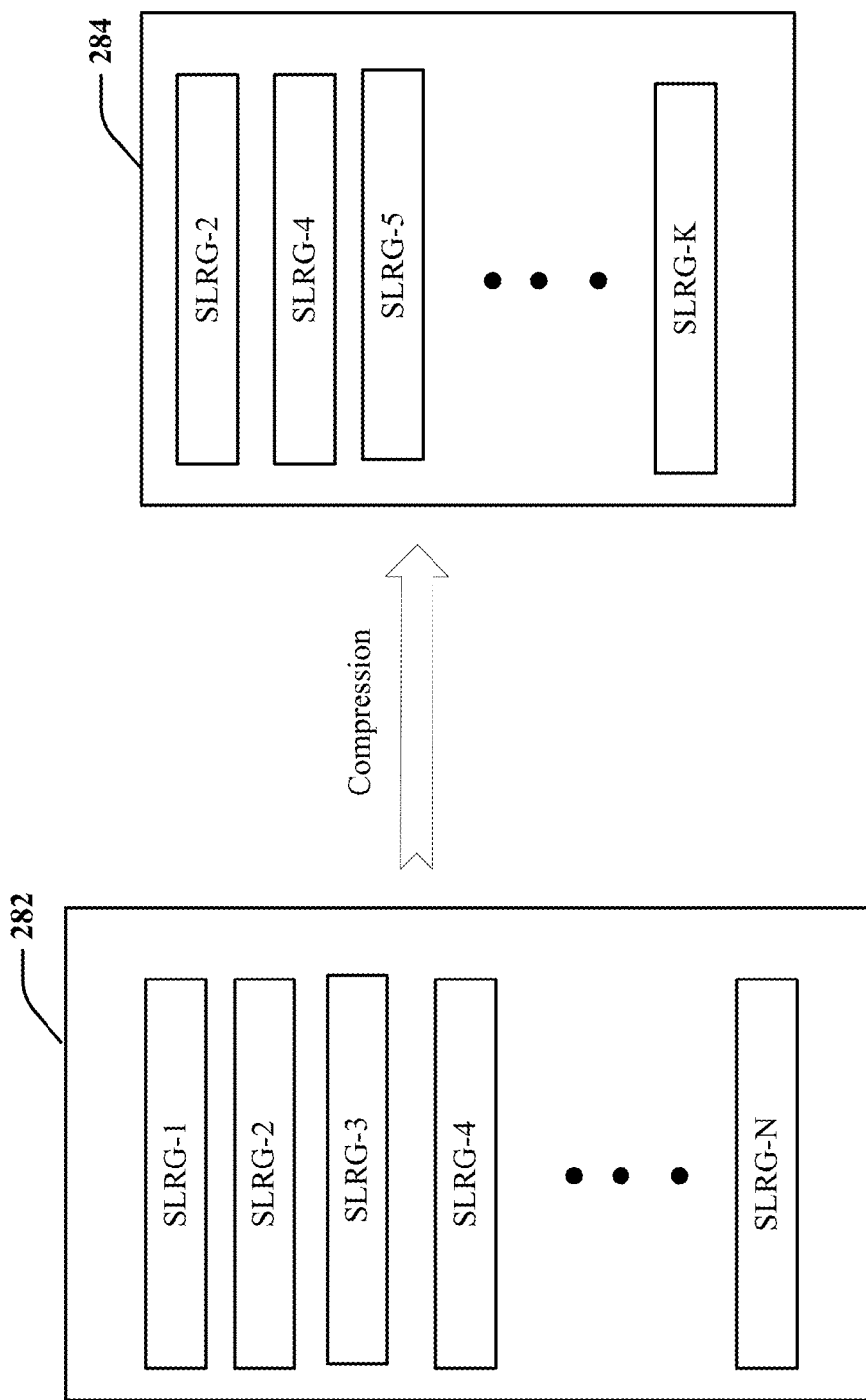
FIG. 2B is a block diagram illustrating an example, non-limiting embodiment of SRLG lists (which can function fully or partially within the communication network of FIG. 1 and/or the network of FIG. 2A) in accordance with various aspects described herein.

Referring now to FIG.2B, this is a block diagram illustrating an example, non-limiting embodiment of SRLG lists 282, 284 (which can function fully or partially within the communication network of FIG. 1 and/or the network of FIG. 2A) in accordance with various aspects described herein. As seen in the example of this figure, a starting SRLG list 282 can include SRLG-1, SRLG-2, SRLG-3, SRLG-4 . . . SRLG-N (wherein "N" is an integer having a maximum value of, for example, thousands). Each of SRLG-1, SRLG-2, SRLG-3, SRLG-4 . . . SRLG-N has associated therewith a respective plurality of link bundles. Further, as a result of a compression or packing process as described herein, SRLG list 284 is created. This list 284 includes a subset of the SRLGs from list 282 (wherein "K" is an integer less than "N"). In various embodiments, K and/or N can be input and/or capped by a user. In various examples, a typical value of N can be thousands whereas a typical value of K can be a few tens.

Figure 2C:
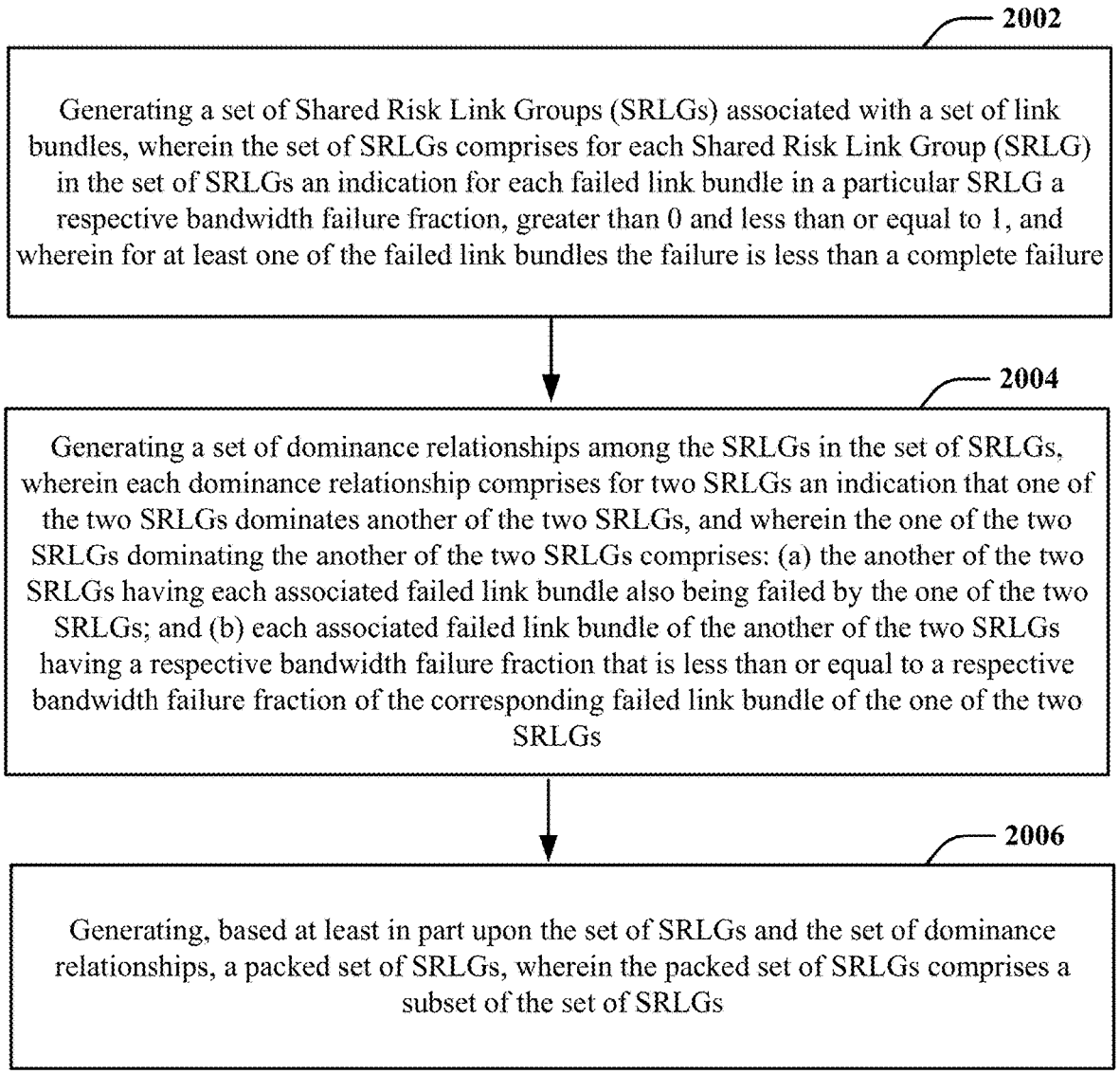
FIG. 2C depicts an illustrative embodiment of a method in accordance with various aspects described herein.

Referring now to FIG. 2C, various steps of a method 2000 according to an embodiment are shown. As seen in this FIG. 2C, step 2002 comprises generating a set of Shared Risk Link Groups (SRLGs) associated with a set of link bundles, wherein the set of SRLGs comprises for each Shared Risk Link Group (SRLG) in the set of SRLGs an indication for each failed link bundle in a particular SRLG a respective bandwidth failure fraction, greater than 0 and less than or equal to 1, and wherein for at least one of the failed link bundles the failure is less than a complete failure. Next, step 2004 comprises generating a set of dominance relationships among the SRLGs in the set of SRLGs, wherein each dominance relationship comprises for two SRLGs an indication that one of the two SRLGs dominates another of the two SRLGs, and wherein the one of the two SRLGs dominating the another of the two SRLGs comprises: (a) the another of the two SRLGs having each associated failed link bundle also being failed by the one of the two SRLGs; and (b) each associated failed link bundle of the another of the two SRLGs having a respective bandwidth failure fraction that is less than or equal to a respective bandwidth failure fraction of the corresponding failed link bundle of the one of the two SRLGs. Next, step 2006 comprises generating, based at least in part upon the set of SRLGs and the set of dominance relationships, a packed set of SRLGs, wherein the packed set of SRLGs comprises a subset of the set of SRLGs.

While for purposes of simplicity of explanation, the respective processes are shown and described as a series of blocks in FIG. 2C, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described herein.

Figure 2D:
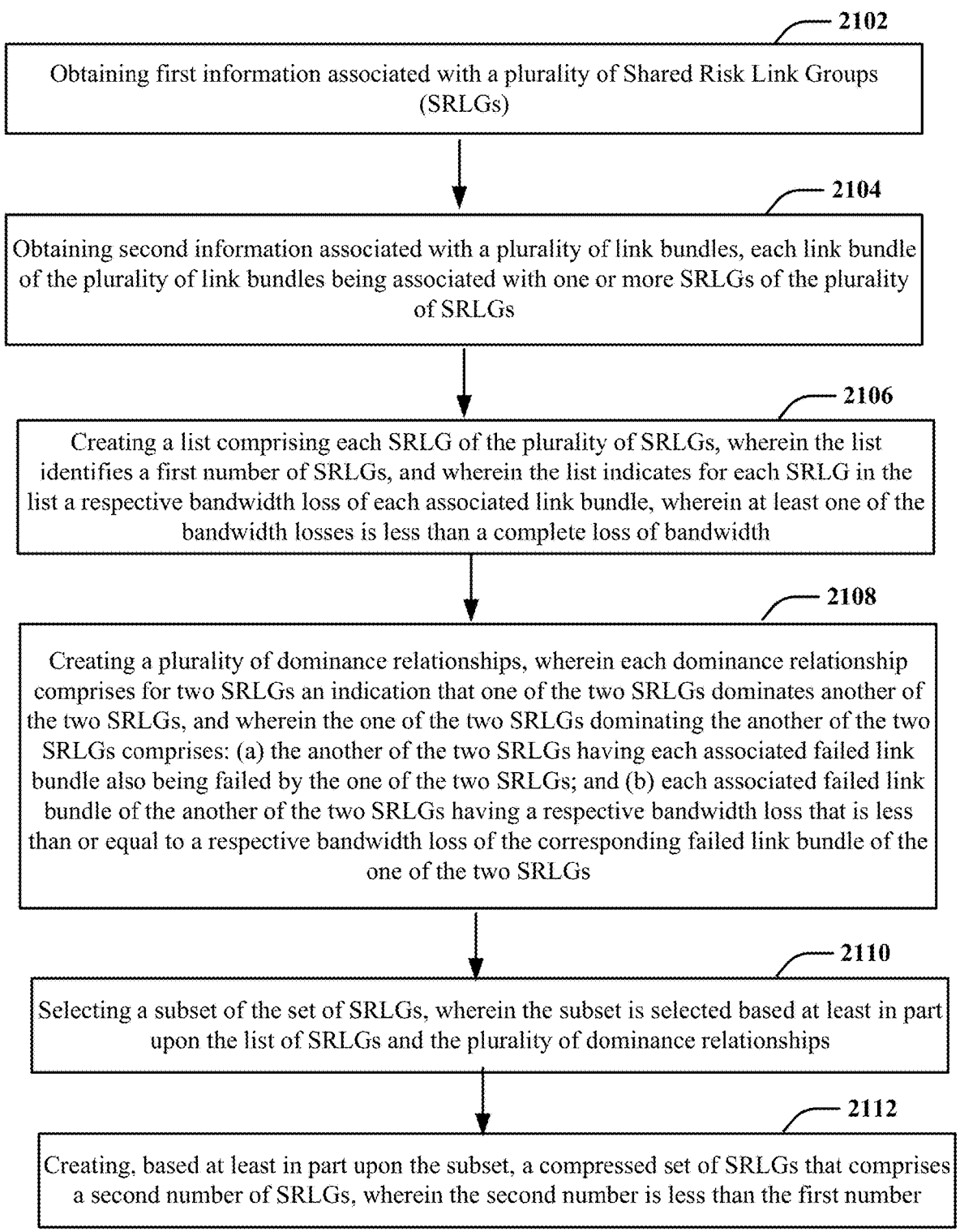
FIG. 2D depicts an illustrative embodiment of a method in accordance with various aspects described herein.

Referring now to FIG. 2D, various steps of a method 2100 according to an embodiment are shown. As seen in this FIG. 2D, step 2102 comprises obtaining first information associated with a plurality of Shared Risk Link Groups (SRLGs). Next, step 2104 comprises obtaining second information associated with a plurality of link bundles, each link bundle of the plurality of link bundles being associated with one or more SRLGs of the plurality of SRLGs. Next, step 2106 comprises creating a list comprising each SRLG of the plurality of SRLGs, wherein the list identifies a first number of SRLGs, and wherein the list indicates for each SRLG in the list a respective bandwidth loss of each associated link bundle, wherein at least one of the bandwidth losses is less than a complete loss of bandwidth. Next, step 2108 comprises creating a plurality of dominance relationships, wherein each dominance relationship comprises for two SRLGs an indication that one of the two SRLGs dominates another of the two SRLGs, and wherein the one of the two SRLGs dominating the another of the two SRLGs comprises: (a) the another of the two SRLGs having each associated failed link bundle also being failed by the one of the two SRLGs; and (b) each associated failed link bundle of the another of the two SRLGs having a respective bandwidth loss that is less than or equal to a respective bandwidth loss of the corresponding failed link bundle of the one of the two SRLGs. Next, step 2110 comprises selecting a subset of the set of SRLGs, wherein the subset is selected based at least in part upon the list of SRLGs and the plurality of dominance relationships. Next, step 2112 comprises creating, based at least in part upon the subset, a compressed set of SRLGs that comprises a second number of SRLGs, wherein the second number is less than the first number.

While for purposes of simplicity of explanation, the respective processes are shown and described as a series of blocks in FIG. 2D, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described herein.

Referring now to FIG. 2E, various steps of a method 2200 according to an embodiment are shown. As seen in this FIG. 2E, step 2202 comprises creating, by a processing system including a processor, a first list comprising a plurality of Shared Risk Link Groups (SRLGs), wherein the first list identifies for each Shared Risk Link Group (SRLG) in the list one or more associated link bundles of a plurality of link bundles, wherein the first list indicates for each link bundle a respective bandwidth loss, and wherein at least one of the bandwidth losses is such that the respective link bundle maintains at least some available bandwidth. Next, step 2204 comprises creating, by the processing system, a plurality of dominance relationships, wherein each dominance relationship comprises for two SRLGs an indication that one of the two SRLGs dominates another of the two SRLGs, and wherein the one of the two SRLGs dominating the another of the two SRLGs comprises: (a) the other of the SRLGs having each associated failed link bundle also being failed by the one of the two SRLGs; and (b) each associated failed link bundle of the other of the SRLGs having a respective bandwidth loss that is less than or equal to a respective bandwidth loss of the corresponding failed link bundle of the one of the two SRLGs. Next, step 2206 comprises creating, by the processing system, based at least in part upon the first list and the dominance relationships, a second list of SRLGs, wherein the second list of SRLGs comprises a subset of the first list of SRLGs. Next, step 2208 comprises facilitating, by the processing system, use of the second list of SRLGs to modify flow of traffic on a communication network.

While for purposes of simplicity of explanation, the respective processes are shown and described as a series of blocks in FIG. 2E, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described herein.

Reference will now be made to packing SRLG lists with partial failures of link bundles according to an embodiment. For the purposes of this discussion, suppose there are N SRLGs and the i-th SRLG is denoted by $S_i$ where i ranges from 1 to N (it is assumed for this discussion that every SRLG in the list fails at least one link bundle fully or partially).

Suppose $S_i$ fails $M_i$ link bundles
Let $l_{ij}$ represent the j-th link bundle failed by $S_i$
Let $p_{ij}$ represent the fraction (in terms of bandwidth) of link bundle $l_{ij}$ failed by $S_i$
$0 < p_{ij} \leq 1$ The above represents the set of all SRLGs and what fraction of which specific link bundle is failed by each of the SRLGs.

Next, we establish the dominance relationship among the SRLGs.

An SRLG $S_i$ dominates another SRLG $S_j$ (and conversely $S_j$ is dominated by $S_i$) if and only if:
Each link bundle failed by $S_j$ is also failed by $S_i$ and the fraction of the link bundle failed by $S_j$ is less than or equal to the fraction of the link bundle failed by $S_i$.

In the above scenario, the dominance becomes strict dominance if at least one of the "less than or equal" conditions is satisfied as "strictly less than" condition or the dominating SRLG fails at least one link bundle that is not failed by the dominated SRLG.

It is possible that two SRLGs $S_i$ and $S_j$ have identical failure signatures. In that case they dominate each other.

From the original list of N SRLGs, we create a shorter packed list of K SRLGs (let's denote the i-th SRLG of the shorter packed list by $P_i$) such that no SRLG in the shorter packed list is dominated by another SRLG in the shorter packed list and every SRLG in the original list is dominated by at least one SRLG in the shorter packed list.

One way of creating the shorter packed list is this:
Start the shorter packed list with SRLG $S_1$. So, set K=1 and set $P_1 = S_1$.
Next consider $S_2$ for possible inclusion to the shorter packed list.
If $S_2$ is dominated by $P_1$ then do nothing and there is no change to the shorter packed list.
Else If $P_1$ is dominated by $S_2$ then keep K=1 but set $P_1 = S_2$ (so, basically remove $S_1$ from the shorter packed list and replace it with $S_2$).
Else If $S_2$ is not dominated by $P_1$ and $P_1$ is not dominated by $S_2$ then increase K to 2 and set $P_2 = S_2$.
Continue the above process for each of the other SRLGs in the original list as explained below:
Suppose currently there are K SRLGs in the shorter packed list and the SRLG $S_i$ of the original list is being considered for possible inclusion to the shorter packed list. Compare $S_i$ to each of the members of the current shorter packed list.
If it (i.e., $S_i$) is dominated by any member then it (i.e., $S_i$) drops out (that is, is not added to the shorter packed list).
Else If it (i.e., $S_i$) dominates any member for the first time, then it (i.e., $S_i$) replaces that member. If it (i.e., $S_i$) has found its place in the list this way, then it (i.e., $S_i$) continues to check against every other member and if it (i.e., $S_i$) dominates that other member then that member is removed (from the shorter packed list).
Else If it (i.e., $S_i$) is not dominated by any existing member of the packed list and it (i.e., $S_i$) does not dominate any existing member of the packed list then K is increased by 1 and we set $P_K = S_i$.

In one specific example, if there are two SRLGs that have identical failure signatures then the one that comes later in the original list will be dropped (that is, is not added to the shorter packed list).

What happens if a packed list of size $K_{old}$ existed (from previous time) before we start the above process? In one example, do the following:
Re-order the list of N new SRLGs in such a way that the first $K_{old}$ members are the same as the members of the original packed list (if any member of the older packed list is no longer a member of the new list of N SRLGs then that member is disregarded).
The above will ensure that there is maximal chance of retaining members of the original packed list. A new SRLG will be added to the list only if it is not dominated by any of the original members of the packed list. An original member of the packed list will be dropped only if it is strictly dominated by a different SRLG in the new environment.

As described herein, various embodiments provide for compression of a list of SRLGs such that only the dominant ones (from an original list) are included in the compressed list. In one example, the compressed list can be generated dynamically. In another example, the compressed list can be sent (e.g., dynamically) to one or more routers in a network. In various examples, the compressed list can accurately provide necessary risk information, can enable efficient setup of bypass tunnels, and/or can improve failure analysis applications.

As described herein, various embodiments can enable a savings in setup time (e.g., a set-up time for desired router configuration), can reduce (or minimize) errors, and/or can avoid potentially expensive paths.

As described herein, various embodiments can be applied to optical SRLGs for FRR and/or failure analysis.

As described herein, various embodiments can provide a mechanism that accounts for partial failure(s) vs. failure of a whole span.

As described herein, various embodiments can provide a mechanism that accounts for a fraction of bandwidth.

As described herein, various embodiments can provide a mechanism that covers worst case failures.

As described herein, various embodiments can provide a mechanism that is dynamic.

As described herein, various embodiments can provide a mechanism that takes into account (e.g., periodically) network changes over time.

As described herein, various embodiments can provide a mechanism that uses one or more secondary factors to decide which SRLG from a list to include in a shortened (or compressed) version of the list.

As described herein, various embodiments can be applied to a configuration in which link bundles are not completely independent.

As described herein, various embodiments can be applied to a network that is growing and in which more link bundles and/or SRLGs are dynamically added.

As described herein, various embodiments can be applied to a network that is shrinking and in which link bundles and/or SRLGs are dynamically deleted.

As described herein, various embodiments can be applied in a dynamic manner depending upon network conditions (e.g., depending on network conditions dynamically add link bundles/SRLGs or dynamically delete link bundles/SRLGs).

Referring now to FIG. 3, a block diagram 300 is shown illustrating an example, non-limiting embodiment of a virtualized communication network in accordance with various aspects described herein. In particular a virtualized communication network is presented that can be used to implement some or all of the subsystems and functions of system 100 of FIG. 1, some or all of the subsystems and functions of system 200 of FIG. 2A, some or all of the features of the lists of FIG. 2B, some or all of method 2000 of FIG. 2C, some or all of method 2100 of FIG. 2D and/or some or all of method 2200 of FIG. 2E. For example, virtualized communication network 300 can facilitate in whole or in part dynamic compression applied to a list of Shared Risk Link Groups (as well as transmission of such compressed list of Shared Risk Link Groups to one or more network routers (e.g., in real-time) for use in FRR and/or other analyses).

In particular, a cloud networking architecture is shown that leverages cloud technologies and supports rapid innovation and scalability via a transport layer 350, a virtualized network function cloud 325 and/or one or more cloud computing environments 375. In various embodiments, this cloud networking architecture is an open architecture that leverages application programming interfaces (APIs); reduces complexity from services and operations; supports more nimble business models; and rapidly and seamlessly scales to meet evolving customer requirements including traffic growth, diversity of traffic types, and diversity of performance and reliability expectations.

In contrast to traditional network elements—which are typically integrated to perform a single function, the virtualized communication network employs virtual network elements (VNEs) 330, 332, 334, etc. that perform some or all of the functions of network elements 150, 152, 154, 156, etc. For example, the network architecture can provide a substrate of networking capability, often called Network Function Virtualization Infrastructure (NFVI) or simply infrastructure that is capable of being directed with software and Software Defined Networking (SDN) protocols to perform a broad variety of network functions and services. This infrastructure can include several types of substrates. The most typical type of substrate being servers that support Network Function Virtualization (NFV), followed by packet forwarding capabilities based on generic computing resources, with specialized network technologies brought to bear when general purpose processors or general purpose integrated circuit devices offered by merchants (referred to herein as merchant silicon) are not appropriate. In this case, communication services can be implemented as cloud-centric workloads.

As an example, a traditional network element 150 (shown in FIG. 1), such as an edge router can be implemented via a VNE 330 composed of NFV software modules, merchant silicon, and associated controllers. The software can be written so that increasing workload consumes incremental resources from a common resource pool, and moreover so that it's elastic: so the resources are only consumed when needed. In a similar fashion, other network elements such as other routers, switches, edge caches, and middle-boxes are instantiated from the common resource pool. Such sharing of infrastructure across a broad set of uses makes planning and growing infrastructure easier to manage.

In an embodiment, the transport layer 350 includes fiber, cable, wired and/or wireless transport elements, network elements and interfaces to provide broadband access 110, wireless access 120, voice access 130, media access 140 and/or access to content sources 175 for distribution of content to any or all of the access technologies. In particular, in some cases a network element needs to be positioned at a specific place, and this allows for less sharing of common infrastructure. Other times, the network elements have specific physical layer adapters that cannot be abstracted or virtualized, and might require special DSP code and analog front-ends (AFEs) that do not lend themselves to implementation as VNEs 330, 332 or 334. These network elements can be included in transport layer 350.

The virtualized network function cloud 325 interfaces with the transport layer 350 to provide the VNEs 330, 332, 334, etc. to provide specific NFVs. In particular, the virtualized network function cloud 325 leverages cloud operations, applications, and architectures to support networking workloads. The virtualized network elements 330, 332 and 334 can employ network function software that provides either a one-for-one mapping of traditional network element function or alternately some combination of network functions designed for cloud computing. For example, VNEs 330, 332 and 334 can include route reflectors, domain name system (DNS) servers, and dynamic host configuration protocol (DHCP) servers, system architecture evolution (SAE) and/or mobility management entity (MME) gateways, broadband network gateways, IP edge routers for IP-VPN, Ethernet and other services, load balancers, distributers and other network elements. Because these elements don't typically need to forward large amounts of traffic, their workload can be distributed across a number of servers—each of which adds a portion of the capability, and overall which creates an elastic function with higher availability than its former monolithic version. These virtual network elements 330, 332, 334, etc. can be instantiated and managed using an orchestration approach similar to those used in cloud compute services.

The cloud computing environments 375 can interface with the virtualized network function cloud 325 via APIs that expose functional capabilities of the VNEs 330, 332, 334, etc. to provide the flexible and expanded capabilities to the virtualized network function cloud 325. In particular, network workloads may have applications distributed across the virtualized network function cloud 325 and cloud computing environment 375 and in the commercial cloud, or might simply orchestrate workloads supported entirely in NFV infrastructure from these third party locations.

Figure 4:
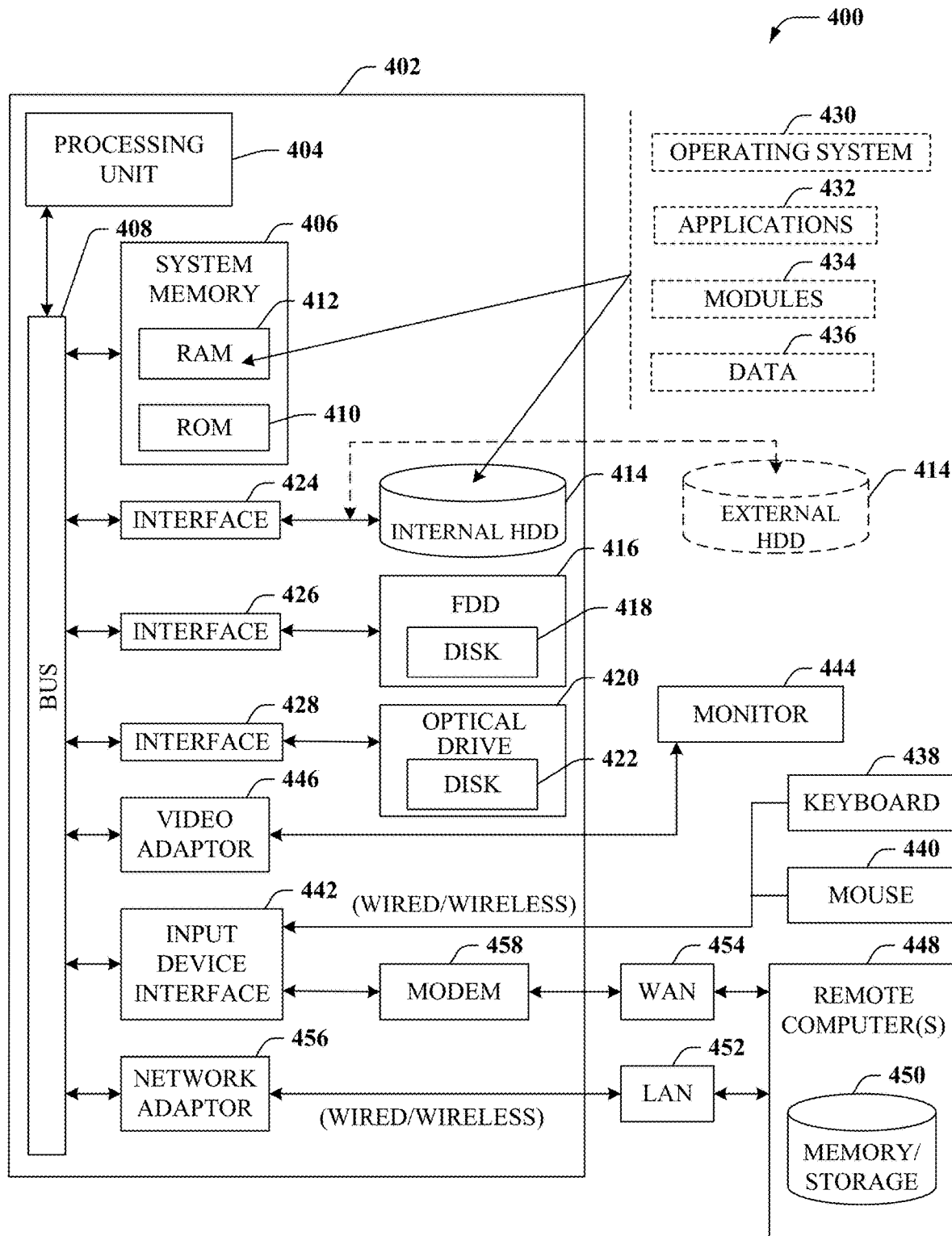
FIG. 4 is a block diagram of an example, non-limiting embodiment of a computing environment in accordance with various aspects described herein.

Turning now to FIG. 4, there is illustrated a block diagram of a computing environment in accordance with various aspects described herein. In order to provide additional context for various embodiments of the embodiments described herein, FIG. 4 and the following discussion are intended to provide a brief, general description of a suitable computing environment 400 in which the various embodiments of the subject disclosure can be implemented. In particular, computing environment 400 can be used in the implementation of network elements 150, 152, 154, 156, access terminal 112, base station or access point 122, switching device 132, media terminal 142, and/or VNEs 330, 332, 334, etc. Each of these devices can be implemented via computer-executable instructions that can run on one or more computers, and/or in combination with other program modules and/or as a combination of hardware and software. For example, computing environment 400 can facilitate in whole or in part dynamic compression applied to a list of Shared Risk Link Groups (as well as transmission of such compressed list of Shared Risk Link Groups to one or more network routers (e.g., in real-time) for use in FRR and/or other analyses).

Generally, program modules comprise routines, programs, components, data structures, etc., that perform particular tasks or implement particular abstract data types. Moreover, those skilled in the art will appreciate that the methods can be practiced with other computer system configurations, comprising single-processor or multiprocessor computer systems, minicomputers, mainframe computers, as well as personal computers, hand-held computing devices, microprocessor-based or programmable consumer electronics, and the like, each of which can be operatively coupled to one or more associated devices.

As used herein, a processing circuit includes one or more processors as well as other application specific circuits such as an application specific integrated circuit, digital logic circuit, state machine, programmable gate array or other circuit that processes input signals or data and that produces output signals or data in response thereto. It should be noted that while any functions and features described herein in association with the operation of a processor could likewise be performed by a processing circuit.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically comprise a variety of media, which can comprise computer-readable storage media and/or communications media, which two terms are used herein differently from one another as follows. Computer-readable storage media can be any available storage media that can be accessed by the computer and comprises both volatile and nonvolatile media, removable and non-removable media. By way of example, and not limitation, computer-readable storage media can be implemented in connection with any method or technology for storage of information such as computer-readable instructions, program modules, structured data or unstructured data.

Computer-readable storage media can comprise, but are not limited to, random access memory (RAM), read only memory (ROM), electrically erasable programmable read only memory (EEPROM),flash memory or other memory technology, compact disk read only memory (CD-ROM), digital versatile disk (DVD) or other optical disk storage, magnetic cassettes, magnetic tape, magnetic disk storage or other magnetic storage devices or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and comprises any information delivery or transport media. The term "modulated data signal" or signals refers to a signal that has one or more of its characteristics set or changed in such a manner as to encode information in one or more signals. By way of example, and not limitation, communication media comprise wired media, such as a wired network or direct-wired connection, and wireless media such as acoustic, RF, infrared and other wireless media.

With reference again to FIG. 4, the example environment can comprise a computer 402, the computer 402 comprising a processing unit 404, a system memory 406 and a system bus 408. The system bus 408 couples system components including, but not limited to, the system memory 406 to the processing unit 404. The processing unit 404 can be any of various commercially available processors. Dual microprocessors and other multiprocessor architectures can also be employed as the processing unit 404.

The system bus 408 can be any of several types of bus structure that can further interconnect to a memory bus (with or without a memory controller), a peripheral bus, and a local bus using any of a variety of commercially available bus architectures. The system memory 406 comprises ROM 410 and RAM 412. A basic input/output system (BIOS) can be stored in a non-volatile memory such as ROM, erasable programmable read only memory (EPROM), EEPROM, which BIOS contains the basic routines that help to transfer information between elements within the computer 402, such as during startup. The RAM 412 can also comprise a high-speed RAM such as static RAM for caching data.

The computer 402 further comprises an internal hard disk drive (HDD) 414 (e.g., EIDE, SATA), which internal HDD 414 can also be configured for external use in a suitable chassis (not shown), a magnetic floppy disk drive (FDD) 416, (e.g., to read from or write to a removable diskette 418) and an optical disk drive 420, (e.g., reading a CD-ROM disk 422 or, to read from or write to other high capacity optical media such as the DVD). The HDD 414, magnetic FDD 416 and optical disk drive 420 can be connected to the system bus 408 by a hard disk drive interface 424, a magnetic disk drive interface 426 and an optical drive interface 428, respectively. The hard disk drive interface 424 for external drive implementations comprises at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 402, the drives and storage media accommodate the storage of any data in a suitable digital format. Although the description of computer-readable storage media above refers to a hard disk drive (HDD), a removable magnetic diskette, and a removable optical media such as a CD or DVD, it should be appreciated by those skilled in the art that other types of storage media which are readable by a computer, such as zip drives, magnetic cassettes, flash memory cards, cartridges, and the like, can also be used in the example operating environment, and further, that any such storage media can contain computer-executable instructions for performing the methods described herein.

A number of program modules can be stored in the drives and RAM 412, comprising an operating system 430, one or more application programs 432, other program modules 434 and program data 436. All or portions of the operating system, applications, modules, and/or data can also be cached in the RAM 412. The systems and methods described herein can be implemented utilizing various commercially available operating systems or combinations of operating systems.

A user can enter commands and information into the computer 402 through one or more wired/wireless input devices, e.g., a keyboard 438 and a pointing device, such as a mouse 440. Other input devices (not shown) can comprise a microphone, an infrared (IR) remote control, a joystick, a game pad, a stylus pen, touch screen or the like. These and other input devices are often connected to the processing unit 404 through an input device interface 442 that can be coupled to the system bus 408, but can be connected by other interfaces, such as a parallel port, an IEEE 1394 serial port, a game port, a universal serial bus (USB) port, an IR interface, etc.

A monitor 444 or other type of display device can be also connected to the system bus 408 via an interface, such as a video adapter 446. It will also be appreciated that in alternative embodiments, a monitor 444 can also be any display device (e.g., another computer having a display, a smart phone, a tablet computer, etc.) for receiving display information associated with computer 402 via any communication means, including via the Internet and cloud-based networks. In addition to the monitor 444, a computer typically comprises other peripheral output devices (not shown), such as speakers, printers, etc.

The computer 402 can operate in a networked environment using logical connections via wired and/or wireless communications to one or more remote computers, such as a remote computer(s) 448. The remote computer(s) 448 can be a workstation, a server computer, a router, a personal computer, portable computer, microprocessor-based entertainment appliance, a peer device or other common network node, and typically comprises many or all of the elements described relative to the computer 402, although, for purposes of brevity, only a remote memory/storage device 450 is illustrated. The logical connections depicted comprise wired/wireless connectivity to a local area network (LAN) 452 and/or larger networks, e.g., a wide area network (WAN) 454. Such LAN and WAN networking environments are commonplace in offices and companies, and facilitate enterprise-wide computer networks, such as intranets, all of which can connect to a global communications network, e.g., the Internet.

When used in a LAN networking environment, the computer 402 can be connected to the LAN 452 through a wired and/or wireless communication network interface or adapter 456. The adapter 456 can facilitate wired or wireless communication to the LAN 452, which can also comprise a wireless AP disposed thereon for communicating with the adapter 456.

When used in a WAN networking environment, the computer 402 can comprise a modem 458 or can be connected to a communications server on the WAN 454 or has other means for establishing communications over the WAN 454, such as by way of the Internet. The modem 458, which can be internal or external and a wired or wireless device, can be connected to the system bus 408 via the input device interface 442. In a networked environment, program modules depicted relative to the computer 402 or portions thereof, can be stored in the remote memory/storage device 450. It will be appreciated that the network connections shown are example and other means of establishing a communications link between the computers can be used.

The computer 402 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This can comprise Wireless Fidelity (Wi-Fi) and BLUETOOTH® wireless technologies. Thus, the communication can be a predefined structure as with a conventional network or simply an ad hoc communication between at least two devices.

Wi-Fi can allow connection to the Internet from a couch at home, a bed in a hotel room or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, n, ac, ag, etc.) to provide secure, reliable, fast wireless connectivity. A Wi-Fi network can be used to connect computers to each other, to the Internet, and to wired networks (which can use IEEE 802.3 or Ethernet). Wi-Fi networks operate in the unlicensed 2.4 and 5 GHz radio bands for example or with products that contain both bands (dual band), so the networks can provide real-world performance similar to the basic 10BaseT wired Ethernet networks used in many offices.

Figure 5:
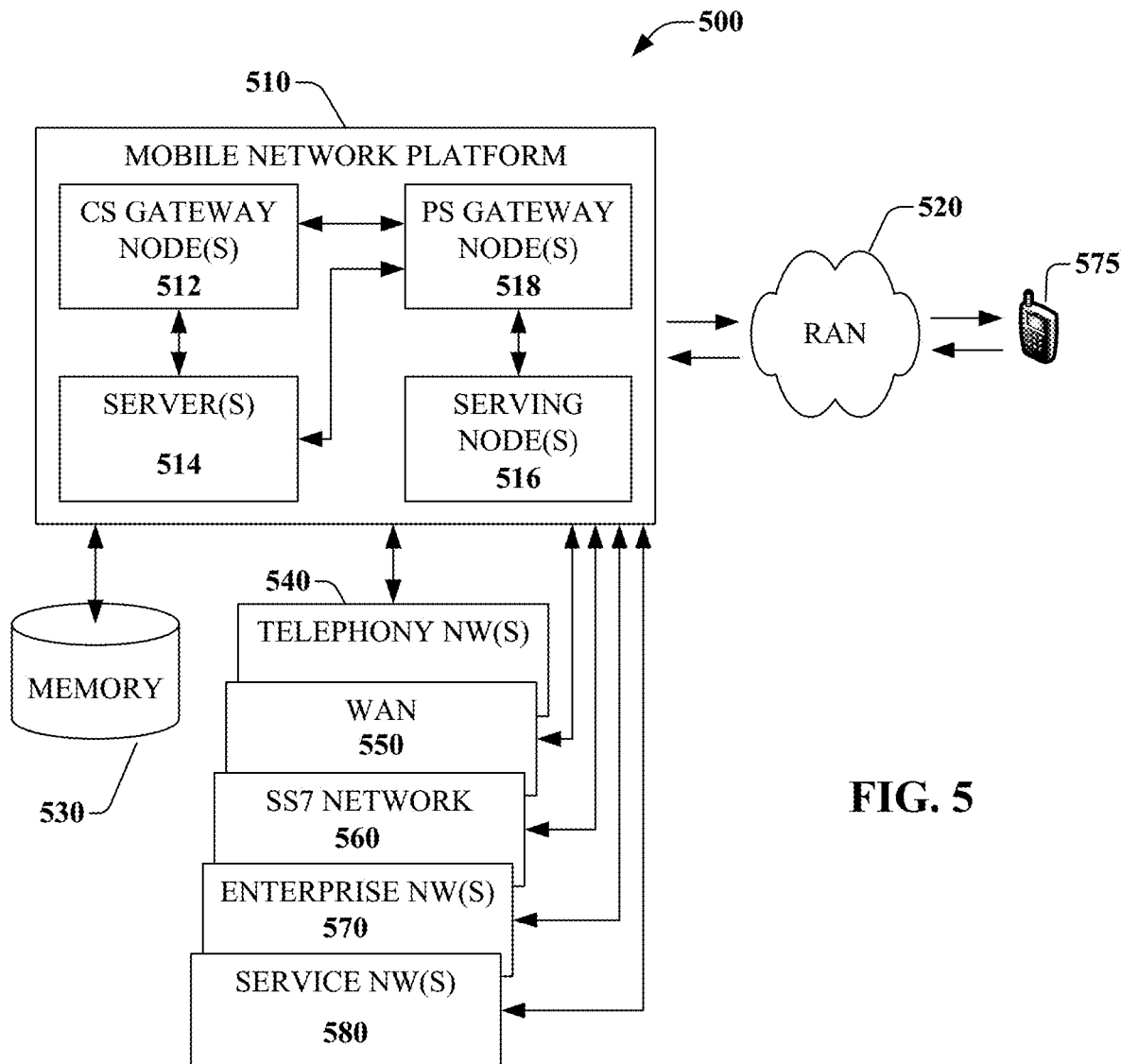
FIG. 5 is a block diagram of an example, non-limiting embodiment of a mobile network platform in accordance with various aspects described herein.

Turning now to FIG. 5, an embodiment 500 of a mobile network platform 510 is shown that is an example of network elements 150, 152, 154, 156, and/or VNEs 330, 332, 334, etc. For example, platform 510 can facilitate in whole or in part dynamic compression applied to a list of Shared Risk Link Groups (as well as transmission of such compressed list of Shared Risk Link Groups to one or more network routers (e.g., in real-time) for use in FRR and/or other analyses). In one or more embodiments, the mobile network platform 510 can generate and receive signals transmitted and received by base stations or access points such as base station or access point 122. Generally, mobile network platform 510 can comprise components, e.g., nodes, gateways, interfaces, servers, or disparate platforms, that facilitate both packet-switched (PS) (e.g., internet protocol (IP), frame relay, asynchronous transfer mode (ATM)) and circuit-switched (CS) traffic (e.g., voice and data), as well as control generation for networked wireless telecommunication. As a non-limiting example, mobile network platform 510 can be included in telecommunications carrier networks, and can be considered carrier-side components as discussed elsewhere herein. Mobile network platform 510 comprises CS gateway node(s) 512 which can interface CS traffic received from legacy networks like telephony network(s) 540 (e.g., public switched telephone network (PSTN), or public land mobile network (PLMN)) or a signaling system #7 (SS7) network 560. CS gateway node(s) 512 can authorize and authenticate traffic (e.g., voice) arising from such networks. Additionally, CS gateway node(s) 512 can access mobility, or roaming, data generated through SS7 network 560; for instance, mobility data stored in a visited location register (VLR), which can reside in memory 530. Moreover, CS gateway node(s) 512 interfaces CS-based traffic and signaling and PS gateway node(s) 518. As an example, in a 3GPP UMTS network, CS gateway node(s) 512 can be realized at least in part in gateway GPRS support node(s) (GGSN). It should be appreciated that functionality and specific operation of CS gateway node(s) 512, PS gateway node(s) 518, and serving node(s) 516, is provided and dictated by radio technology(ies) utilized by mobile network platform 510 for telecommunication over a radio access network 520 with other devices, such as a radiotelephone 575.

In addition to receiving and processing CS-switched traffic and signaling, PS gateway node(s) 518 can authorize and authenticate PS-based data sessions with served mobile devices. Data sessions can comprise traffic, or content(s), exchanged with networks external to the mobile network platform 510, like wide area network(s) (WANs) 550, enterprise network(s) 570, and service network(s) 580, which can be embodied in local area network(s) (LANs), can also be interfaced with mobile network platform 510 through PS gateway node(s) 518. It is to be noted that WANs 550 and enterprise network(s) 570 can embody, at least in part, a service network(s) like IP multimedia subsystem (IMS). Based on radio technology layer(s) available in technology resource(s) or radio access network 520, PS gateway node(s) 518 can generate packet data protocol contexts when a data session is established; other data structures that facilitate routing of packetized data also can be generated. To that end, in an aspect, PS gateway node(s) 518 can comprise a tunnel interface (e.g., tunnel termination gateway (TTG) in 3GPP UMTS network(s) (not shown)) which can facilitate packetized communication with disparate wireless network(s), such as Wi-Fi networks.

In embodiment 500, mobile network platform 510 also comprises serving node(s) 516 that, based upon available radio technology layer(s) within technology resource(s) in the radio access network 520, convey the various packetized flows of data streams received through PS gateway node(s) 518. It is to be noted that for technology resource(s) that rely primarily on CS communication, server node(s) can deliver traffic without reliance on PS gateway node(s) 518; for example, server node(s) can embody at least in part a mobile switching center. As an example, in a 3GPP UMTS network, serving node(s) 516 can be embodied in serving GPRS support node(s) (SGSN).

For radio technologies that exploit packetized communication, server(s) 514 in mobile network platform 510 can execute numerous applications that can generate multiple disparate packetized data streams or flows, and manage (e.g., schedule, queue, format . . . ) such flows. Such application(s) can comprise add-on features to standard services (for example, provisioning, billing, customer support . . . ) provided by mobile network platform 510. Data streams (e.g., content(s) that are part of a voice call or data session) can be conveyed to PS gateway node(s) 518 for authorization/authentication and initiation of a data session, and to serving node(s) 516 for communication thereafter. In addition to application server, server(s) 514 can comprise utility server(s), a utility server can comprise a provisioning server, an operations and maintenance server, a security server that can implement at least in part a certificate authority and firewalls as well as other security mechanisms, and the like. In an aspect, security server(s) secure communication served through mobile network platform 510 to ensure network's operation and data integrity in addition to authorization and authentication procedures that CS gateway node(s) 512 and PS gateway node(s) 518 can enact. Moreover, provisioning server(s) can provision services from external network(s) like networks operated by a disparate service provider; for instance, WAN 550 or Global Positioning System (GPS) network(s) (not shown). Provisioning server(s) can also provision coverage through networks associated to mobile network platform 510 (e.g., deployed and operated by the same service provider), such as the distributed antennas networks shown in FIG. 1(s) that enhance wireless service coverage by providing more network coverage.

It is to be noted that server(s) 514 can comprise one or more processors configured to confer at least in part the functionality of mobile network platform 510. To that end, the one or more processor can execute code instructions stored in memory 530, for example. It is should be appreciated that server(s) 514 can comprise a content manager, which operates in substantially the same manner as described hereinbefore.

In example embodiment 500, memory 530 can store information related to operation of mobile network platform 510. Other operational information can comprise provisioning information of mobile devices served through mobile network platform 510, subscriber databases; application intelligence, pricing schemes, e.g., promotional rates, flat-rate programs, couponing campaigns; technical specification(s) consistent with telecommunication protocols for operation of disparate radio, or wireless, technology layers; and so forth. Memory 530 can also store information from at least one of telephony network(s) 540, WAN 550, SS7 network 560, or enterprise network(s) 570. In an aspect, memory 530 can be, for example, accessed as part of a data store component or as a remotely connected memory store.

In order to provide a context for the various aspects of the disclosed subject matter, FIG. 5, and the following discussion, are intended to provide a brief, general description of a suitable environment in which the various aspects of the disclosed subject matter can be implemented. While the subject matter has been described above in the general context of computer-executable instructions of a computer program that runs on a computer and/or computers, those skilled in the art will recognize that the disclosed subject matter also can be implemented in combination with other program modules. Generally, program modules comprise routines, programs, components, data structures, etc. that perform particular tasks and/or implement particular abstract data types.

Figure 6:
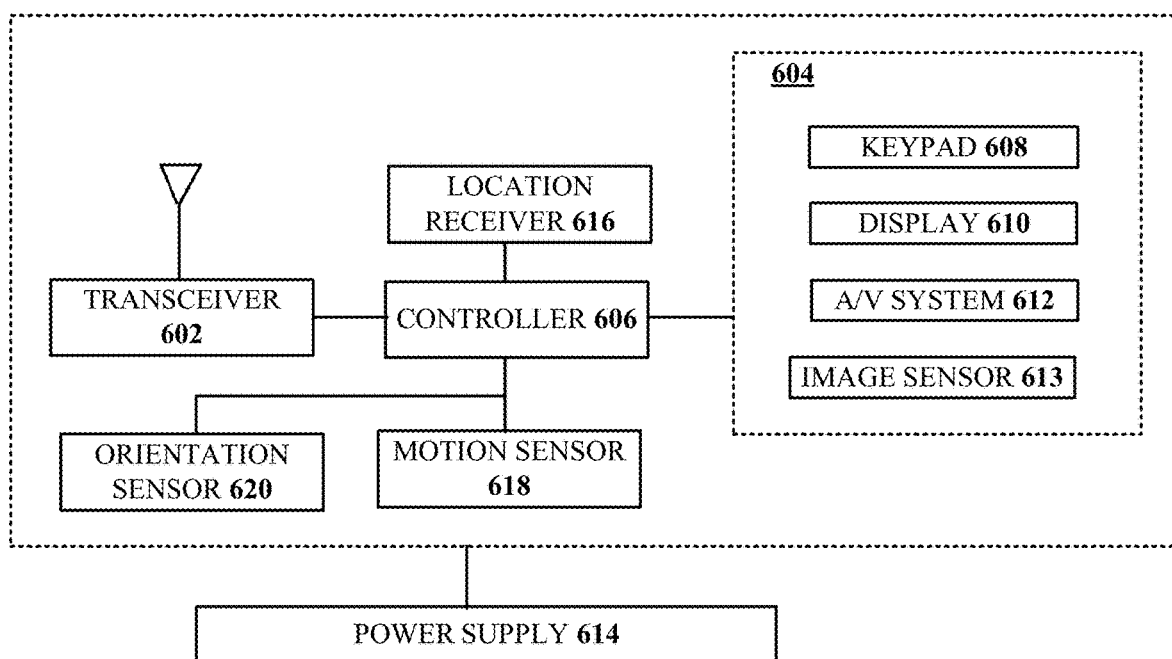
FIG. 6 is a block diagram of an example, non-limiting embodiment of a communication device in accordance with various aspects described herein.

Turning now to FIG. 6, an illustrative embodiment of a communication device 600 is shown. The communication device 600 can serve as an illustrative embodiment of devices such as data terminals 114, mobile devices 124, vehicle 126, display devices 144 or other client devices for communication via either communications network 125. For example, computing device 600 can facilitate in whole or in part dynamic compression applied to a list of Shared Risk Link Groups (as well as transmission of such compressed list of Shared Risk Link Groups to one or more network routers (e.g., in real-time) for use in FRR and/or other analyses).

The communication device 600 can comprise a wireline and/or wireless transceiver 602 (herein transceiver 602), a user interface (UI) 604, a power supply 614, a location receiver 616, a motion sensor 618, an orientation sensor 620, and a controller 606 for managing operations thereof. The transceiver 602 can support short-range or long-range wireless access technologies such as Bluetooth®, ZigBee®, WiFi, DECT, or cellular communication technologies, just to mention a few (Bluetooth® and ZigBee® are trademarks registered by the Bluetooth® Special Interest Group and the ZigBee® Alliance, respectively). Cellular technologies can include, for example, CDMA-1X, UMTS/HSDPA, GSM/GPRS, TDMA/EDGE, EV/DO, WiMAX, SDR, LTE, as well as other next generation wireless communication technologies as they arise. The transceiver 602 can also be adapted to support circuit-switched wireline access technologies (such as PSTN), packet-switched wireline access technologies (such as TCP/IP, VoIP, etc.), and combinations thereof.

The UI 604 can include a depressible or touch-sensitive keypad 608 with a navigation mechanism such as a roller ball, a joystick, a mouse, or a navigation disk for manipulating operations of the communication device 600. The keypad 608 can be an integral part of a housing assembly of the communication device 600 or an independent device operably coupled thereto by a tethered wireline interface (such as a USB cable) or a wireless interface supporting for example Bluetooth®. The keypad 608 can represent a numeric keypad commonly used by phones, and/or a QWERTY keypad with alphanumeric keys. The UI 604 can further include a display 610 such as monochrome or color LCD (Liquid Crystal Display), OLED (Organic Light Emitting Diode) or other suitable display technology for conveying images to an end user of the communication device 600. In an embodiment where the display 610 is touch-sensitive, a portion or all of the keypad 608 can be presented by way of the display 610 with navigation features.

The display 610 can use touch screen technology to also serve as a user interface for detecting user input. As a touch screen display, the communication device 600 can be adapted to present a user interface having graphical user interface (GUI) elements that can be selected by a user with a touch of a finger. The display 610 can be equipped with capacitive, resistive or other forms of sensing technology to detect how much surface area of a user's finger has been placed on a portion of the touch screen display. This sensing information can be used to control the manipulation of the GUI elements or other functions of the user interface. The display 610 can be an integral part of the housing assembly of the communication device 600 or an independent device communicatively coupled thereto by a tethered wireline interface (such as a cable) or a wireless interface.

The UI 604 can also include an audio system 612 that utilizes audio technology for conveying low volume audio (such as audio heard in proximity of a human ear) and high volume audio (such as speakerphone for hands free operation). The audio system 612 can further include a microphone for receiving audible signals of an end user. The audio system 612 can also be used for voice recognition applications. The UI 604 can further include an image sensor 613 such as a charged coupled device (CCD) camera for capturing still or moving images.

The power supply 614 can utilize common power management technologies such as replaceable and rechargeable batteries, supply regulation technologies, and/or charging system technologies for supplying energy to the components of the communication device 600 to facilitate long-range or short-range portable communications. Alternatively, or in combination, the charging system can utilize external power sources such as DC power supplied over a physical interface such as a USB port or other suitable tethering technologies.

The location receiver 616 can utilize location technology such as a global positioning system (GPS) receiver capable of assisted GPS for identifying a location of the communication device 600 based on signals generated by a constellation of GPS satellites, which can be used for facilitating location services such as navigation. The motion sensor 618 can utilize motion sensing technology such as an accelerometer, a gyroscope, or other suitable motion sensing technology to detect motion of the communication device 600 in three-dimensional space. The orientation sensor 620 can utilize orientation sensing technology such as a magnetometer to detect the orientation of the communication device 600 (north, south, west, and east, as well as combined orientations in degrees, minutes, or other suitable orientation metrics).

The communication device 600 can use the transceiver 602 to also determine a proximity to a cellular, WiFi, Bluetooth®, or other wireless access points by sensing techniques such as utilizing a received signal strength indicator (RSSI) and/or signal time of arrival (TOA) or time of flight (TOF) measurements. The controller 606 can utilize computing technologies such as a microprocessor, a digital signal processor (DSP), programmable gate arrays, application specific integrated circuits, and/or a video processor with associated storage memory such as Flash, ROM, RAM, SRAM, DRAM or other storage technologies for executing computer instructions, controlling, and processing data supplied by the aforementioned components of the communication device 600.

Other components not shown in FIG. 6 can be used in one or more embodiments of the subject disclosure. For instance, the communication device 600 can include a slot for adding or removing an identity module such as a Subscriber Identity Module (SIM) card or Universal Integrated Circuit Card (UICC). SIM or UICC cards can be used for identifying subscriber services, executing programs, storing subscriber data, and so on.

The terms "first," "second," "third," and so forth, as used in the claims, unless otherwise clear by context, is for clarity only and doesn't otherwise indicate or imply any order in time. For instance, "a first determination," "a second determination," and "a third determination," does not indicate or imply that the first determination is to be made before the second determination, or vice versa, etc.

In the subject specification, terms such as "store," "storage," "data store," data storage," "database," and substantially any other information storage component relevant to operation and functionality of a component, refer to "memory components," or entities embodied in a "memory" or components comprising the memory. It will be appreciated that the memory components described herein can be either volatile memory or nonvolatile memory, or can comprise both volatile and nonvolatile memory, by way of illustration, and not limitation, volatile memory, non-volatile memory, disk storage, and memory storage. Further, non-volatile memory can be included in read only memory (ROM), programmable ROM (PROM), electrically programmable ROM (EPROM), electrically erasable ROM (EEPROM), or flash memory. Volatile memory can comprise random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

Moreover, it will be noted that the disclosed subject matter can be practiced with other computer system configurations, comprising single-processor or multiprocessor computer systems, mini-computing devices, mainframe computers, as well as personal computers, hand-held computing devices (e.g., PDA, phone, smartphone, watch, tablet computers, netbook computers, etc.), microprocessor-based or programmable consumer or industrial electronics, and the like. The illustrated aspects can also be practiced in distributed computing environments where tasks are performed by remote processing devices that are linked through a communications network; however, some if not all aspects of the subject disclosure can be practiced on stand-alone computers. In a distributed computing environment, program modules can be located in both local and remote memory storage devices.

In one or more embodiments, information regarding use of services can be generated including services being accessed, media consumption history, user preferences, and so forth. This information can be obtained by various methods including user input, detecting types of communications (e.g., video content vs. audio content), analysis of content streams, sampling, and so forth. The generating, obtaining and/or monitoring of this information can be responsive to an authorization provided by the user. In one or more embodiments, an analysis of data can be subject to authorization from user(s) associated with the data, such as an opt-in, an opt-out, acknowledgement requirements, notifications, selective authorization based on types of data, and so forth.

Some of the embodiments described herein can also employ artificial intelligence (AI) to facilitate automating one or more features described herein. The embodiments (e.g., in connection with automatically applying dynamic compression to a list of Shared Risk Link Groups (as well as automatic transmission of such compressed list of Shared Risk Link Groups to one or more network routers (e.g., in real-time) for use in FRR and/or other analyses) can employ various AI-based schemes for carrying out various embodiments thereof. Moreover, the classifier can be employed to determine a ranking or priority of each SRLG, each SRLG list, and/or each router. A classifier is a function that maps an input attribute vector, x=(x1, x2, x3, x4, . . . , xn), to a confidence that the input belongs to a class, that is, f(x)=confidence (class). Such classification can employ a probabilistic and/or statistical-based analysis (e.g., factoring into the analysis utilities and costs) to determine or infer an action that a user desires to be automatically performed. A support vector machine (SVM) is an example of a classifier that can be employed. The SVM operates by finding a hypersurface in the space of possible inputs, which the hypersurface attempts to split the triggering criteria from the non-triggering events. Intuitively, this makes the classification correct for testing data that is near, but not identical to training data. Other directed and undirected model classification approaches comprise, e.g., naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

As will be readily appreciated, one or more of the embodiments can employ classifiers that are explicitly trained (e.g., via a generic training data) as well as implicitly trained (e.g., via observing UE behavior, operator preferences, historical information, receiving extrinsic information). For example, SVMs can be configured via a learning or training phase within a classifier constructor and feature selection module. Thus, the classifier(s) can be used to automatically learn and perform a number of functions, including but not limited to automatically applying dynamic compression to a list of Shared Risk Link Groups (as well as automatic transmission of such compressed list of Shared Risk Link Groups to one or more network routers (e.g., in real-time) for use in FRR and/or other analyses), etc.

As used in some contexts in this application, in some embodiments, the terms "component," "system" and the like are intended to refer to, or comprise, a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, computer-executable instructions, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components. While various components have been illustrated as separate components, it will be appreciated that multiple components can be implemented as a single component, or a single component can be implemented as multiple components, without departing from example embodiments.

Further, the various embodiments can be implemented as a method, apparatus or article of manufacture using standard programming and/or engineering techniques to produce software, firmware, hardware or any combination thereof to control a computer to implement the disclosed subject matter. The term "article of manufacture" as used herein is intended to encompass a computer program accessible from any computer-readable device or computer-readable storage/communications media. For example, computer readable storage media can include, but are not limited to, magnetic storage devices (e.g., hard disk, floppy disk, magnetic strips), optical disks (e.g., compact disk (CD), digital versatile disk (DVD)), smart cards, and flash memory devices (e.g., card, stick, key drive). Of course, those skilled in the art will recognize many modifications can be made to this configuration without departing from the scope or spirit of the various embodiments.

In addition, the words "example" and "exemplary" are used herein to mean serving as an instance or illustration. Any embodiment or design described herein as "example" or "exemplary" is not necessarily to be construed as preferred or advantageous over other embodiments or designs. Rather, use of the word example or exemplary is intended to present concepts in a concrete fashion. As used in this application, the term "or" is intended to mean an inclusive "or" rather than an exclusive "or". That is, unless specified otherwise or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Moreover, terms such as "user equipment," "mobile station," "mobile," subscriber station," "access terminal," "terminal," "handset," "mobile device" (and/or terms representing similar terminology) can refer to a wireless device utilized by a subscriber or user of a wireless communication service to receive or convey data, control, voice, video, sound, gaming or substantially any data-stream or signaling-stream. The foregoing terms are utilized interchangeably herein and with reference to the related drawings.

Furthermore, the terms "user," "subscriber," "customer," "consumer" and the like are employed interchangeably throughout, unless context warrants particular distinctions among the terms. It should be appreciated that such terms can refer to human entities or automated components supported through artificial intelligence (e.g., a capacity to make inference based, at least, on complex mathematical formalisms), which can provide simulated vision, sound recognition and so forth.

As employed herein, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components or any combination thereof designed to perform the functions described herein. Processors can exploit nano-scale architectures such as, but not limited to, molecular and quantum-dot based transistors, switches and gates, in order to optimize space usage or enhance performance of user equipment. A processor can also be implemented as a combination of computing processing units.

As used herein, terms such as "data storage," data storage," "database," and substantially any other information storage component relevant to operation and functionality of a component, refer to "memory components," or entities embodied in a "memory" or components comprising the memory. It will be appreciated that the memory components or computer-readable storage media, described herein can be either volatile memory or nonvolatile memory or can include both volatile and nonvolatile memory.

What has been described above includes mere examples of various embodiments. It is, of course, not possible to describe every conceivable combination of components or methodologies for purposes of describing these examples, but one of ordinary skill in the art can recognize that many further combinations and permutations of the present embodiments are possible. Accordingly, the embodiments disclosed and/or claimed herein are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

In addition, a flow diagram may include a "start" and/or "continue" indication. The "start" and "continue" indications reflect that the steps presented can optionally be incorporated in or otherwise used in conjunction with other routines. In this context, "start" indicates the beginning of the first step presented and may be preceded by other activities not specifically shown. Further, the "continue" indication reflects that the steps presented may be performed multiple times and/or may be succeeded by other activities not specifically shown. Further, while a flow diagram indicates a particular ordering of steps, other orderings are likewise possible provided that the principles of causality are maintained.

As may also be used herein, the term(s) "operably coupled to", "coupled to", and/or "coupling" includes direct coupling between items and/or indirect coupling between items via one or more intervening items. Such items and intervening items include, but are not limited to, junctions, communication paths, components, circuit elements, circuits, functional blocks, and/or devices. As an example of indirect coupling, a signal conveyed from a first item to a second item may be modified by one or more intervening items by modifying the form, nature or format of information in a signal, while one or more elements of the information in the signal are nevertheless conveyed in a manner than can be recognized by the second item. In a further example of indirect coupling, an action in a first item can cause a reaction on the second item, as a result of actions and/or reactions in one or more intervening items.

Although specific embodiments have been illustrated and described herein, it should be appreciated that any arrangement which achieves the same or similar purpose may be substituted for the embodiments described or shown by the subject disclosure. The subject disclosure is intended to cover any and all adaptations or variations of various embodiments. Combinations of the above embodiments, and other embodiments not specifically described herein, can be used in the subject disclosure. For instance, one or more features from one or more embodiments can be combined with one or more features of one or more other embodiments. In one or more embodiments, features that are positively recited can also be negatively recited and excluded from the embodiment with or without replacement by another structural and/or functional feature. The steps or functions described with respect to the embodiments of the subject disclosure can be performed in any order. The steps or functions described with respect to the embodiments of the subject disclosure can be performed alone or in combination with other steps or functions of the subject disclosure, as well as from other embodiments or from other steps that have not been described in the subject disclosure. Further, more than or less than all of the features described with respect to an embodiment can also be utilized.

What is claimed is:

1. A device comprising:
a processing system including a processor; and
a memory that stores executable instructions that, when executed by the processing system, facilitate performance of operations, the operations comprising:
generating a set of Shared Risk Link Groups (SRLGs) associated with a set of link bundles, wherein the set of SRLGs comprises for each Shared Risk Link Group (SRLG) in the set of SRLGs an indication for each failed link bundle in a particular SRLG a respective bandwidth failure fraction, greater than 0 and less than or equal to 1, and wherein for at least one of the failed link bundles the failure is less than a complete failure;
generating a set of dominance relationships among the SRLGs in the set of SRLGs, wherein each dominance relationship comprises for two SRLGs an indication that one of the two SRLGs dominates another of the two SRLGs, and wherein the one of the two SRLGs dominating the another of the two SRLGs comprises: (a) the other of the two SRLGs having each associated failed link bundle also being failed by the one of the two SRLGs; and (b) each associated failed link bundle of the other of the SRLGs having a respective bandwidth failure fraction that is less than or equal to a respective bandwidth failure fraction of the corresponding failed link bundle of the one of the two SRLGs; and
generating, based at least in part upon the set of SRLGs and the set of dominance relationships, a packed set of SRLGs, wherein the packed set of SRLGs comprises a subset of the set of SRLGs.

2. The device of claim 1, wherein each link bundle of the set of link bundles is part of a Layer 3 Internet Protocol (IP) communications network.

3. The device of claim 1, wherein each link bundle of the set of link bundles is associated with a respective Layer 1 optical communication network.

4. The device of claim 1, wherein each link bundle of the set of link bundles is configured to provide respective communication between nodes of a communications network.

5. The device of claim 4, wherein:
each link bundle of the set of link bundles is associated with a respective plurality of fiber optic links; and
for the at least one of the failed link bundles the failure that is less than a complete failure comprises one or more of the respective fiber optic links not functioning and one or more other ones of the respective fiber optic links remaining functioning.

6. The device of claim 5, wherein the one or more other ones of the respective fiber optic links remaining functioning comprises the one or more other ones of the respective fiber optic links remaining capable of providing communication between the nodes of the communications network.

7. The device of claim 6, wherein each bandwidth failure fraction comprises a respective failed bandwidth value divided by a respective potential bandwidth value, the respective potential bandwidth value being a value that would have been available in an absence of the respective failure.

8. The device of claim 1, wherein the packed set of SRLGs excludes one or more excluded SRLGs from the set of SRLGs that are dominated by one or more included SRLGs in the packed set of SRLGs.

9. The device of claim 1, wherein:
communications between nodes of a communications network are provided by respective link bundles; and
the operations further comprise facilitating changing one or more communication routes between one or mode nodes in accordance with the packed set of SRLGs.

10. A non-transitory machine-readable medium comprising executable instructions that, when executed by a processing system including a processor, facilitate performance of operations, the operations comprising:
obtaining first information associated with a plurality of Shared Risk Link Groups (SRLGs);
obtaining second information associated with a plurality of link bundles, each link bundle of the plurality of link bundles being associated with one or more SRLGs of the plurality of SRLGs;
creating a list comprising each Shared Risk Link Group (SRLG) of the plurality of SRLGs, wherein the list identifies a first number of SRLGs, and wherein the list indicates for each SRLG in the list a respective bandwidth loss of each associated link bundle, wherein at least one of the bandwidth losses is less than a complete loss of bandwidth;
creating a plurality of dominance relationships, wherein each dominance relationship comprises for two SRLGs an indication that one of the two SRLGs dominates another of the two SRLGs, and wherein the one of the two SRLGs dominating the another of the two SRLGs comprises: (a) the other of the two SRLGs having each associated failed link bundle also being failed by the one of the two SRLGs; and (b) each associated failed link bundle of the other of the two SRLGs having a respective bandwidth loss that is less than or equal to a respective bandwidth loss of the corresponding failed link bundle of the one of the two SRLGs;
selecting a subset of the set of SRLGs, wherein the subset is selected based at least in part upon the list of SRLGs and the plurality of dominance relationships; and creating, based at least in part upon the subset, a compressed set of SRLGs that comprises a second number of SRLGs, wherein the second number is less than the first number.

11. The non-transitory machine-readable medium of claim 10, wherein:
the obtaining the first information comprises obtaining the first information from one or more databases; and
the obtaining the second information comprises obtaining the second information from the one or more databases.

12. The non-transitory machine-readable medium of claim 11, wherein the operations further comprise storing third information indicative of the compressed set of SRLGs in the one or more databases.

13. The non-transitory machine-readable medium of claim 10, wherein:
each link bundle of the plurality of link bundles is associated with a respective plurality of fiber optic links; and
the at least one of the bandwidth losses being less than a complete loss of bandwidth comprises one or more of the respective fiber optic links of a particular link bundle not being capable of carrying network traffic and one or more other ones of the respective fiber optic links remaining capable of carrying network traffic.

14. The non-transitory machine-readable medium of claim 10, wherein the compressed set of SRLGs excludes all SRLGs from the set of SRLGs that are dominated by each SRLG in the packed set of SRLGs.

15. The non-transitory machine-readable medium of claim 10, wherein link bundle failure conditions are such that the one of the two SRLGs dominates the another of the two SRLGs and the another of the two SRLGs dominates the one of the two SRLGs.

16. The non-transitory machine-readable medium of claim 10, wherein the operations further comprise facilitating use of the compressed set of SRLGs to route traffic flow on a network.

17. The non-transitory machine-readable medium of claim 16, wherein the network comprises a plurality of routers.

18. A method comprising:
creating, by a processing system including a processor, a first list comprising a plurality of Shared Risk Link Groups (SRLGs), wherein the first list identifies for each Shared Risk Link Group (SRLG) in the list one or more associated link bundles of a plurality of link bundles, wherein the first list indicates for each link bundle a respective bandwidth loss, and wherein at least one of the bandwidth losses is such that the respective link bundle maintains at least some available bandwidth;

creating, by the processing system, a plurality of dominance relationships, wherein each dominance relationship comprises for two SRLGs an indication that one of the two SRLGs dominates another of the two SRLGs, and wherein the one of the two SRLGs dominating the another of the two SRLGs comprises: (a) the other of the two SRLGs having each associated failed link bundle also being failed by the one of the two SRLGs; and (b) each associated failed link bundle of the other of the two SRLGs having a respective bandwidth loss that is less than or equal to a respective bandwidth loss of the corresponding failed link bundle of the one of the two SRLGs;

creating, by the processing system, based at least in part upon the first list and the dominance relationships, a second list of SRLGs, wherein the second list of SRLGs comprises a subset of the first list of SRLGs; and facilitating, by the processing system, use of the second list of SRLGs to modify flow of traffic on a communications network.

19. The method of claim 18, wherein each link bundle of the plurality of link bundles provides respective communication between nodes of the communication network.

20. The method of claim 19, wherein the facilitating the use of the second list of SRLGs to modify the flow of the traffic on the communications network comprises transmitting one or more first messages to one or more routers on the communications network; transmitting the second list of SRLGs to the one or more routers on the communications network; transmitting one or more second messages to one or more other processing systems; transmitting the second set of SRLGs to the one or more other processing systems; or any combination thereof.

* * * * *